G. COMADA.
ANIMAL-TRAPS.

No. 195,704. Patented Oct. 2, 1877.

WITNESSES:
R. S. Reeves
Nat. E. Oliphant

INVENTOR:
George Comada
BY C. H. Fowler,
ATTORNEY.

UNITED STATES PATENT OFFICE.

GEORGE COMADA, OF BALTIMORE, MARYLAND.

IMPROVEMENT IN ANIMAL-TRAPS.

Specification forming part of Letters Patent No. 195,704, dated October 2, 1877; application filed August 11, 1877.

*To all whom it may concern:*

Be it known that I, GEORGE COMADA, of Baltimore, in the county of Baltimore and State of Maryland, have invented a new and valuable Improvement in Animal-Traps; and I do hereby declare that the following is a full, clear, and exact description of the construction and operation of the same, reference being had to the annexed drawings, making a part of this specification, and to the letters and figures of reference marked thereon.

Figure 1:
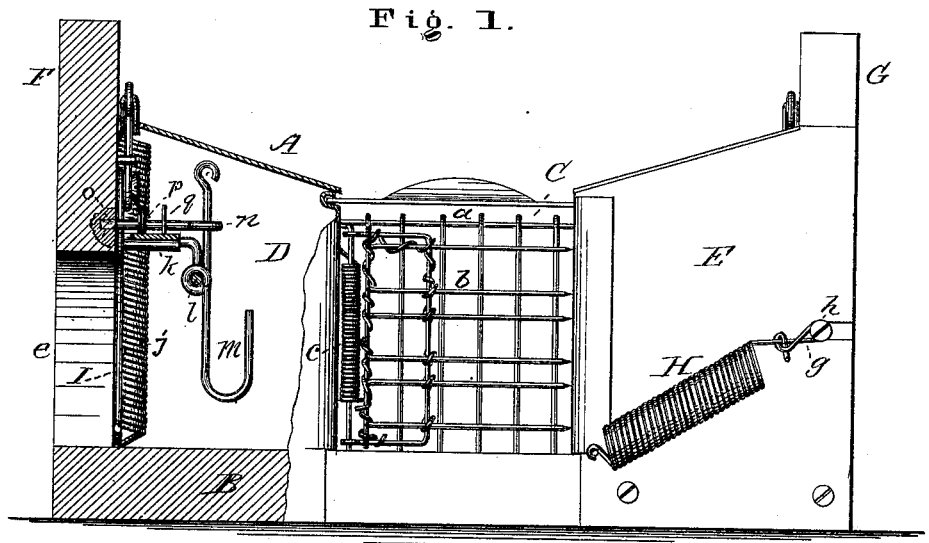
Figure 2:
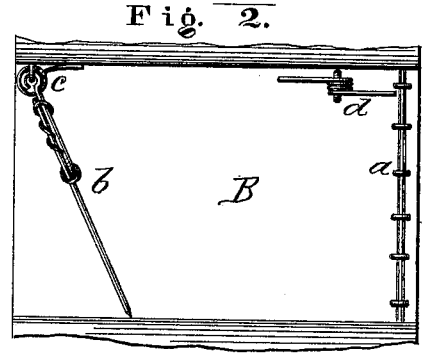
Figure 3:
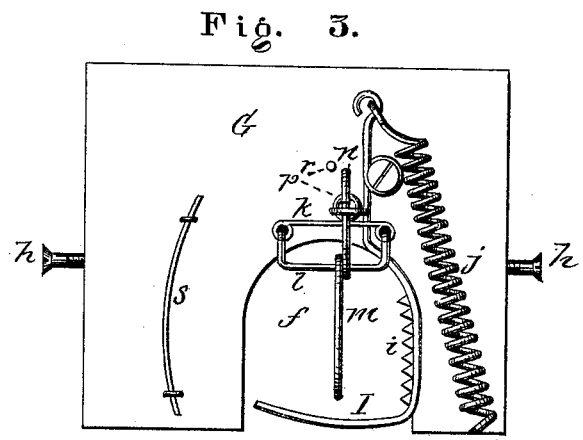

Figure 1 of the drawing is a representation of a side elevation of my invention, partly in section. Fig. 2 is a plan view of the central compartment. Fig. 3 is a similar view of the end trap detached from the frame.

The object and purpose of the present invention is to provide a simple, cheap, and effective rat-trap that will serve the double purpose of catching the animal either alive or killing it after being caught; and the invention consists in the general construction and arrangement of the several parts, as will be hereinafter described, and subsequently pointed out in the claim.

In the accompanying drawings, A represents the frame, of any suitable metal, secured to a base, B, and has a central compartment, C, having upon one side a wire grating, *a*, and upon the other side a hinged door, *b*, of wire, said door opening inwardly, and automatically closing by a spring, *c*. If desired, however, in place of the grating *a* a similarly-constructed door may be used. Upon the floor of the compartment C is a pivoted bait-pin, *d*.

The frame A is so constructed as to form two compartments or chambers, D E, which receive at their ends removable walls F G, formed with suitable entrance-openings *e f*, said walls being held to their place by suitable springs H, one end of which is secured to the side of the compartment, and the other end terminating in a loop, *g*, by which it may be secured to a pin, *h*, upon the side of the wall.

It will be seen by this construction that the walls may be readily detached and removed from the compartments D E when it is desired to use only the central compartment C, and for further reasons to fix, adjust, or set the traps connected to said walls. Pivoted to the wall is an arm or curved blade, I, provided with suitable teeth *i*, which, when the trap is set, partially encircles the entrance-opening formed in the wall, as illustrated in Fig. 3 of the drawings; but when the trap is sprung, a spring, *j*, connected to said arm or blade and to the wall, throws it against the neck or head of the animal. The mechanism by which the trap is set consists of a plate, *k*, to which is secured a curved rod, *l*. To this rod is secured a pivotal or swinging bait-hook, *m*, set by a pin, *n*, attached thereto, the end of said pin, in setting the trap, fitting into an opening, *o*, in the wall, the end of the pin *n* passed down through an eye, *p*, to retain it in a perpendicular position, the pin also bearing against a lug, *q*, which, together with the eye *p*, facilitates the insertion of the pin in the opening. One end of the rod *l*, together with the plate *k* and the pin *r*, form stops to limit the movement of the arm or blade I, the plate being cut away at its lower edge to allow the passage of the same, and also to have sufficient play when the trap is sprung. A curved slotted plate, *s*, serves the purpose of preventing the animal from bending the blade or arm.

It will be seen that by constructing a trap according to my invention, two kind or different traps are obtained, which can be used separately or together, as, if desired, the walls upon which the end traps are attached may be removed and secured over a rat-hole by suitable means.

Having now fully described my invention, what I claim as new, and desire to secure by Letters Patent, is—

The combination, with the central compartment C, having swinging door *b* and spring *c*, of the end compartments D E, which consist of the removable walls F G, springs *j*, bait-hooks *m*, pins *n*, eyes *p*, lugs *q*, and opening *o*, constructed to operate substantially as and for the purpose set forth.

In testimony that I claim the above I have hereunto subscribed my name in the presence of two witnesses.

GEORGE × COMADA.
his mark.

Witnesses:
NAT. E. OLIPHANT,
D. M. HOWARD.